United States Patent
Debreczeni et al.

[15] 3,699,138
[45] Oct. 17, 1972

[54] PREPARATION OF DISTANNANES

[72] Inventors: Eugene J. Debreczeni; Bernard G. Kushlefsky, both of Edison, N.J.

[73] Assignee: M&T Chemicals, Inc., Greenwich, Conn.

[22] Filed: June 18, 1971

[21] Appl. No.: 154,702

[52] U.S. Cl. ............................................. 260/429.7
[51] Int. Cl. ................................................ C07f 7/22
[58] Field of Search ................................... 260/429.7

[56] References Cited

UNITED STATES PATENTS

| | | |
|---|---|---|
| 3,311,649 | 3/1967 | Molt et al. ............... 260/429.7 |
| 2,965,661 | 12/1960 | Ramsden ................ 260/429.7 |
| 3,027,393 | 3/1962 | Jenkner .................. 260/429.7 |
| 3,105,000 | 9/1963 | Hardy ..................... 260/429.7 |
| 3,132,070 | 5/1964 | Lukes ..................... 260/429.7 |

*Primary Examiner*—James E. Poer
*Assistant Examiner*—Werten F. W. Bellamy
*Attorney*—Kenneth G. Wheeless et al.

[57] ABSTRACT

Distannanes of the formula $R_3Sn-SnR_3$, wherein R represents a monovalent hydrocarbon radical, are prepared in high yield and purity by reacting the corresponding triorganotin halide with molten metallic sodium at elevated temperature in the absence of any solvent or diluent other than the reactants.

5 Claims, No Drawings

PREPARATION OF DISTANNANES

BACKGROUND OF THE INVENTION

The present invention relates to the preparation of distannanes. Distannanes have been prepared by reacting a trialkyltin chlordie with sodium in liquid ammonia. Such a process is commercially undesirable since it requires the use of high-pressure equipment.

Relatively low yields (e.g., 56 percent) of distannanes are reportedly obtained by reacting tributyltin chloride with a 20 percent excess of sodium n a hydrocarbon solvent, e.g. naphtha. U.S. Pat. No. 3,311,649 teaches that the yield of distannanes can be substantially increased by replacing the hydrocarbon solvent with a tetraalkyltin compound. The foregoing methods leave much to be desired with regard to yield, purity, and/or volume efficiency, i.e. the volume of reaction mixture required to obtain a given amount of product, assuming 100 percent conversion. In addition, the tetraorganotin compounds are both costly and quite toxic, making them undesirable solvents for any reaction.

Accordingly, it is an object of the present invention to prepare distannanes in improved yield and purity. Further objects are to prepare distannanes under atmospheric pressure and to improve volume efficiency by eliminating the need for any solvent or diluent other than the two reactants.

SUMMARY OF THE INVENTION

The present invention provides an improved method for preparing distannanes of the formula $R_3Sn-SnR_3$, wherein R represents a monovalent alkyl hydrocarbon radical containing between two and 12 carbon atoms inclusive, said method comprising reacting a trialkyltin halide $R_3SnX$ with sodium metal, wherein the improvements comprise carrying out the reaction using molten sodium metal in the absence of any solvent or diluent other than the trialkyltin halide, permitting the reaction mixture to reach a temperature between 100° and 220°C., then maintaining the reaction mixture at about 200°C. until the reaction is substantially complete, and then isolating the resultant distannane.

DETAILED DESCRIPTION OF THE INVENTION

The reaction between sodium metal and trialkyltin halide is often highly exothermic, and it is, therefore, preferable to have about half the sodium metal present in the initial reaction mixture. Should atmospheric moisture or other impurity which is reactive with sodium be present in the initial mixture, it is preferred to employ a slight excess of sodium metal. The mixture of sodium and trialkyltin halide is heated at least to he melting point sodium, i.e., 97.5°C. Temperatures between 170° and 180°C. are preferred since at these temperatures the reaction becomes self-sustaining and the temperature often rises spontaneously to between 200° and 220°C. Once the initial exothermic reaction is complete, the remaining portion of sodium may be added. It is desirable to cool the reaction mixture to near ambient temperature before the second sodium addition to minimize the likelihood of splashing, spillage, or an uncontrollable reaction, all of which could result in injury to personnel operating the equipment. After completion of the second sodium addition, the temperature is again increased to the point where the reaction becomes self-sustaining. Following completion of this exothermic reaction, external heating is applied to maintain the reaction mixture temperature between 180°–200°C. for about 2 hours or longer to ensure a substantially complete reaction.

The final reaction mixture contains an insoluble sodium halide salt formed as a by-product of the reaction. The salt is separated from the liquid phase by any convenient means, i.e., by filtration. Any unreacted sodium will be coprecipitated with the salt. The solid phase should, therefore, be combined with methanol or other alcohol to eliminate the danger of fire resulting from contact between the sodium and atmospheric moisture.

The liquid portion of the reaction mixture is comprised substantially entirely of the desired hexalkylditin a hexalkyl distannane, which can be used without any additional purification. If a product of greater purity is desired, the liquid phase may be distilled. In some instances, the hexalylditin compounds, which are water-white when pure, may be discolored, as a result of impurities in the starting material, i.e., the trialkyltin compound.

The yield of desired product can often be increased by washing the sodium halide by-product with a suitable hydrocarbon solvent, e.g., cyclohexane. Alternatively, the sodium halide is dissolved in water and the solution extracted with the hydrocarbon solvent. The hydrocarbon solvent should be relatively low boiling and, therefore, readily separable from the desired product by distillation or "stripping," i.e., a relatively rapid removal of the solvent under reduced pressure.

Trialkyltin halides suitable for use in the process of this invention contain up to 36 carbon atoms and include compounds such as trimethyltin chloride, tri-n-propyltin chloride, tri-isopropyltin chloride, tri-n-butyltin chloride, tri-sec-butyltin chloride, tri-n-amyltin chloride, tri-n-hexyltin chloride, tri-n-octyltin chloride, tri-n-dodecyltin chloride, etc. Any of the foregoing compounds in which the chlorine atoms are replaced by bromine are also useful providing that they are liquids at the reaction temperature, i.e., above about 100°C.

Since the trialkyltin halide may contain small amounts of impurities, e.g., monoalkyltin trihalides and dialkyltin dihalides, it is desirable to use a slight excess over the theoretical amount required by the stoichiometry of the reaction.

The following examples illustrate preferred embodiments of this invention but should not be interpreted as limiting the scope thereof.

EXAMPLE 1 — Preparation of Hexapropyldistannane

The following reagents were placed in a nitrogen-filled reaction flask equipped with a mechanically driven agitator, water-cooled reflux condenser, thermometer, and nitrogen inlet.

tripropyltin chloride — 283.4 g. (1.0 mole)
sodium metal (10)[5] — 12.6 g. (0.5 moles + 5% excess)
(cut into small chunks)

The contents of the flask were gradually heated to 103°C. at which point an exothermic reaction occurred and the temperature rose spontaneously to 115°C. When the exothermic portion of the reaction was completed, as evidenced by a decrease in the reaction mixture temperature, external heating was applied to maintain the temperature at 200°C., plus or minus 5°C. for 2 hours. The reaction mixture was then allowed to cool to 25°C. at which time an additional 12.6 g. of sodium metal (in small chunks) were added, after which the reaction mixture was heated to 103°C. After the exothermic reaction had subsided, during which the temperature increased to 111°C., the reaction mixture was heated to 200°C. for about 2 hours and then allowed to cool. The excess sodium was reacted by the addition of a small portion (about 25 cc.) of methanol, followed by 100 cc. each of cyclohexane and water, the latter being added to dissolve the sodium chloride which had precipitated during the reaction. The organic phase was separated and the solvents (cyclohexane and methanol) removed by distillation. The residue weighted 208 g. (84 percent yield) and exhibited the following analysis:

tin—45.9%
chlorine—0.7%
bromine number—34.6 and 35.9 (two trials)
calculated for $[n-C_3H_7)_3Sn]_2$ = tin - 47.9%; chlorine—0%; bromine number—34.8%.

EXAMPLE 2 — Preparation of Hexahexyldistannane (Hexahexylditin)

Hexahexylditin was prepared following a procedure similar to that described in Example 1, using 102.4 g. (0.25 mole) of trihexyltin chloride and two substantially equal portions of sodium metal totalling 7.33 g. (0.32 mole). The residue remaining after removal of solvent weighed 58 g. (62 percent yield). Some loss occurred during transfer of product.

| Analysis: | % Calculated | % Found |
|---|---|---|
| % tin | 31.72 | 30.35 |
| % chlorine | 0 | None found |
| Bromine number | 21.36 | 19.2 |

EXAMPLE 3 — Preparation of Hexabutyldistannane

A 5-liter capacity reaction flask equipped with mechanically activated agitator, thermometer, and reflux condenser was charged with 1,952.9 g. (6.0 moles) of tri-n-butyltin chloride and 82.8 g. (3.6 moles) of sodium metal which had been cut into small pieces. The contents of the flask were then heated with agitation to a temperature between 90°–100°C. at which time an exothermic reaction occurred and external heating was discontinued. The temperature of the reaction mixture reached about 200°C. Upon completion of the exothermic reaction, as evidenced by a decrease in reaction mixture temperature, external heating was applied to maintain the temperature at 200°C. for 2 hours. External heating was then discontinued and the reaction mixture allowed to reach ambient temperature, at which time an additional 69 g. (3.0 moles) of finely divided sodium metal were added.

An exothermic reaction ensued upon heating the reaction mixture to 100°C. When the reaction subsided, the temperature was maintained at 190°C. for 2 hours, after which the mixture was allowed to cool. Filtration of the mixture under a nitrogen atmosphere yielded 923.6 g. of a clear, yellow liquid. The solid material was washed with heptane, after which the remaining solid was cautiously added to methanol.

The liquid from the washing was concentrated under reduced pressure to yield 487 g. of a clear, yellow liquid. The combined liquid phases weighted 1,411.4 g. (81.2 percent yield). The two liquids were analyzed with the following results.

| | Calculated | Liquid From Reaction Mixture | Liquid From Washing |
|---|---|---|---|
| % tin | 40.9 | 40.68 | 40.29 |
| % chlorine | 0 | not found | not found |
| Bromine number | 26.3 | 27.5 | 27.6 |

In the foregoing examples the bromine number is equal to the percent of bromine (based on sample weight) which will react with the sample. One mole of bromine is believed to react with one mole of distannane to yield 2 moles of a triorganotin bromide.

Although this invention has been illustrated by reference to specific examples illustrating preferred embodiments, changes therein which clearly fall within the scope of the invention will be apparent to those skilled in the art. It is, therefore, to be limited solely by the scope of the appended claims.

What we claim is:

1. A novel and improved method for preparing distannanes of the formula $R_3Sn-SnR_3$ wherein R represents a monovalent aliphatic hydrocarbon radical containing between two and 12 carbon atoms and X represents a chlorine or bromine atom, by reacting a trialkyltin halide $R_3SnX$ with sodium metal, wherein the improvements comprise using molten sodium metal in the absence of any additional solvent or diluent other than said trialkyltin halide, permitting the reaction mixture to exothermically reach a temperature between about 100° and 200°C., and maintaining said mixture temperature of about 200°C. until the reaction is substantially complete.

2. The method of claim 1 wherein R is selected from the group consisting of propyl, butyl, and hexyl radicals and X is chlorine or bromine.

3. The method of claim 1 wherein the metallic sodium is added in two substantially equal portions, the second portion being added following completion of the initial exothermic reaction.

4. The method of claim 1 wherein the sodium halide produced as a by-product of the reaction is extracted using at least one portion of a hydrocarbon solvent.

5. The process of claim 4 wherein the sodium halide is dissolved in water and the resultant solution is extracted using said hydrocarbon solvent.

* * * * *